(12) United States Patent  (10) Patent No.: US 8,985,705 B2
Bremerkamp et al.  (45) Date of Patent: Mar. 24, 2015

(54) LOW-PROFILE MECHANICAL CONNECTION FOR A DRIVE ARRANGEMENT

(71) Applicant: Joy MM Delaware, Inc., Wilmington, DE (US)

(72) Inventors: Stephen Bremerkamp, Franklin, PA (US); Joshua Lutz, Mercer, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 15 days.

(21) Appl. No.: 13/838,781

(22) Filed: Mar. 15, 2013

(65) Prior Publication Data

US 2014/0265527 A1 Sep. 18, 2014

(51) Int. Cl.
  *E21C 35/00* (2006.01)
  *F16D 11/00* (2006.01)
  *E21C 25/16* (2006.01)

(52) U.S. Cl.
  CPC ............. *F16D 11/00* (2013.01); *E21C 25/16* (2013.01); *E21C 35/00* (2013.01)
  USPC .............. 299/95; 192/94; 192/95; 192/69.91

(58) Field of Classification Search
  USPC ............................ 192/94, 95, 69.91; 299/95
  See application file for complete search history.

(56) References Cited

U.S. PATENT DOCUMENTS

| 1,425,913 | A | * | 8/1922 | Straight ............................ 299/67 |
| 1,924,285 | A | | 8/1933 | Lindgren |
| 2,357,724 | A | * | 9/1944 | Beltz ............................ 180/6.58 |
| 3,682,261 | A | | 8/1972 | Bird |
| 4,043,226 | A | * | 8/1977 | Buuck ............................ 475/158 |
| 4,162,103 | A | | 7/1979 | Georg et al. |
| 4,314,730 | A | | 2/1982 | Plumpton et al. |
| 4,465,319 | A | * | 8/1984 | Brownlie ......................... 299/42 |
| 4,549,449 | A | | 10/1985 | Miller et al. |
| 4,796,143 | A | | 1/1989 | Odenkirchen et al. |
| 4,846,631 | A | | 7/1989 | Parrott |
| 5,899,307 | A | * | 5/1999 | Zaun et al. .................. 192/69.43 |
| 5,913,403 | A | | 6/1999 | Merten et al. |
| 6,607,049 | B2 | * | 8/2003 | Cigal ............................ 180/305 |
| 7,731,298 | B2 | | 6/2010 | Merten et al. |
| 7,886,627 | B2 | | 2/2011 | Martin |
| 2012/0119125 | A1 | | 5/2012 | Biester |

* cited by examiner

*Primary Examiner* — John Kreck
(74) *Attorney, Agent, or Firm* — Michael Best & Friedrich LLP (57) ABSTRACT

A mining machine including a frame, a motor, a drive shaft having a first end and a distal end, a driven component coupled to the drive shaft at the distal end, and a connector assembly between the motor and the drive shaft. The connector assembly including a connection mechanism operable to drivingly connect the motor and the drive shaft, and an adjustment mechanism operable to adjust the connection mechanism between a connected condition, in which the connection mechanism drivingly connects the motor and the drive shaft, and a disconnected condition, in which the driving connection between the motor and the drive shaft is disengaged, the adjustment mechanism including an actuator pivotable about an axis between a connected position corresponding to the connected condition of the adjustment mechanism and a disconnected position corresponding to the disconnected condition of the adjustment mechanism, the actuator being axially fixed relative to the frame.

16 Claims, 9 Drawing Sheets

LOW-PROFILE MECHANICAL CONNECTION FOR A DRIVE ARRANGEMENT

FIELD

The present invention relates to mechanical connections in mining equipment and, more particularly, to a connection between a drive member and a driven member, such as between a motor and a gear train.

SUMMARY

Mining equipment, such as a longwall shearer, a feeder-breaker, a continuous miner, etc., include a drive member, such as a motor, and a driven member, such as a drive shaft of a gear train. A mechanical connection may selectively connect the drive shaft to the motor for operation and disconnect the drive shaft from the motor, for example, for service on the mining equipment. Space for clearance (e.g., between a ranging arm of a shearer and a lump breaker, between a lump breaker and a spill tray) is an issue in mines, and, therefore, a low-profile mechanical connection may be desired.

In one independent embodiment, a mining machine may generally include a frame, a motor, a drive shaft having a first end and a distal end, a driven component coupled to the drive shaft at the distal end, and a connector assembly between the motor and the drive shaft. The connector assembly may include a connection mechanism operable to drivingly connect the motor and the drive shaft, and an adjustment mechanism operable to adjust the connection mechanism between a connected condition, in which the connection mechanism drivingly connects the motor and the drive shaft, and a disconnected condition, in which the driving connection between the motor and the drive shaft is disengaged, the adjustment mechanism including an actuator pivotable about an axis between a connected position corresponding to the connected condition of the adjustment mechanism and a disconnected position corresponding to the disconnected condition of the adjustment mechanism, the actuator being axially fixed relative to the frame.

In another independent embodiment, a connector assembly for a mining machine may be provided. The mining machine may include a frame, a motor, a drive shaft having a first end and a distal end, and a driven component coupled to the drive shaft at the distal end, the connector assembly being between the motor and the drive shaft. The connector assembly may generally include a connection mechanism operable to drivingly connect the motor and the drive shaft, and an adjustment mechanism operable to adjust the connection mechanism between a connected condition, in which the connection mechanism drivingly connects the motor and the drive shaft, and a disconnected condition, in which the driving connection between the motor and the drive shaft is disengaged. The adjustment mechanism may include an actuator pivotable about an axis between a connected position corresponding to the connected condition of the adjustment mechanism and a disconnected position corresponding to the disconnected condition of the adjustment mechanism, the actuator being axially fixed relative to the frame.

In yet another independent embodiment, a method of operating a mining machine may be provided. The mining machine may include a frame, a motor, a drive shaft having a first end and a distal end, a driven component coupled to the drive shaft at the distal end, and a connector assembly between the motor and the drive shaft. The method may generally include providing a connection mechanism operable to drivingly connect the motor and the drive shaft, providing an adjustment mechanism operable to adjust the connection mechanism, the adjustment mechanism including an actuator pivotable about an axis, the actuator being axially fixed relative to the frame, adjusting the connection mechanism to one of a connected condition, in which the connection mechanism drivingly connects the motor and the drive shaft, and a disconnected condition, in which the driving connection between the motor and the drive shaft is disengaged, and pivoting the actuator about the axis from a position corresponding to the one of the connected condition and the disconnected condition to a position corresponding to the other of the connected condition and the disconnected condition.

Other independent aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

Figure 1:
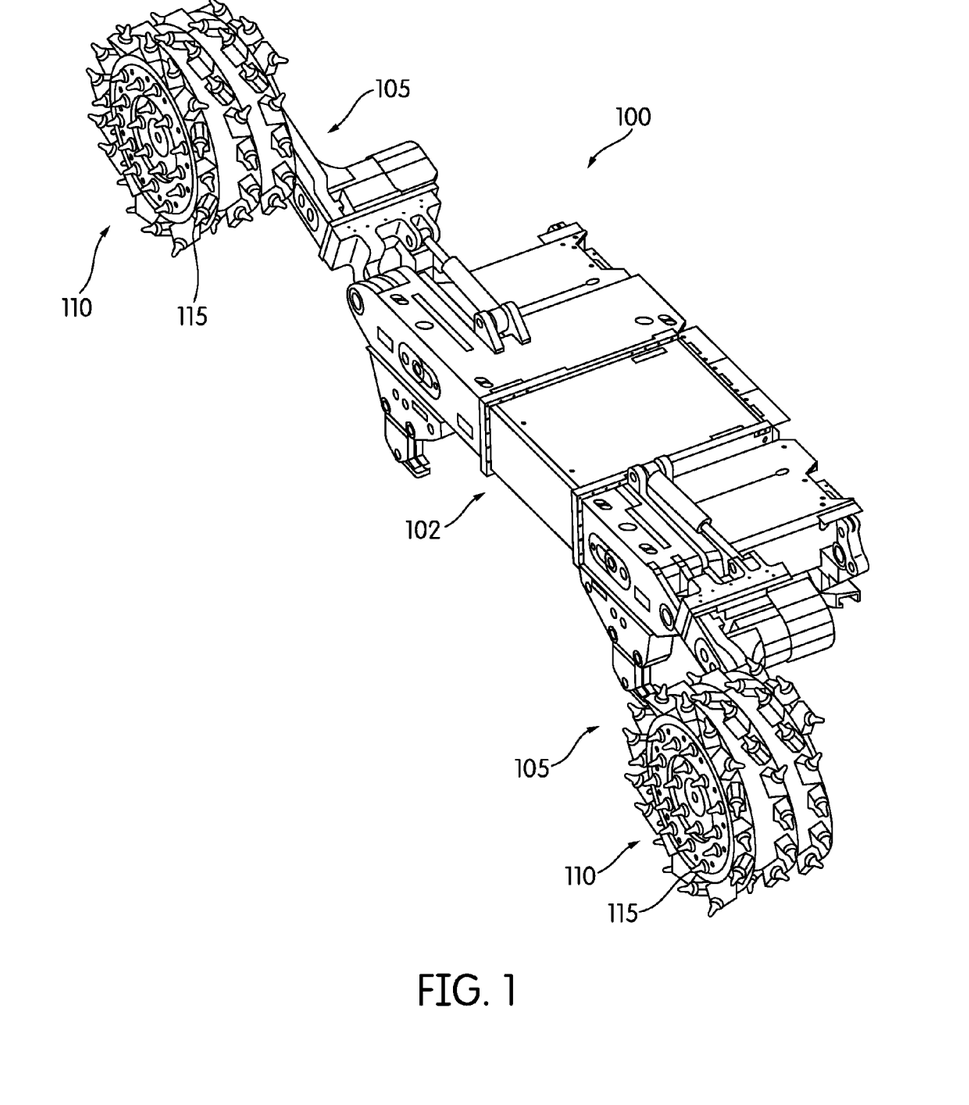
FIG. 1 illustrates a mining machine, such as a longwall shearer, according to an independent embodiment of the invention.

FIG. 1 illustrates a mining machine 100, such as a longwall shearer. Although illustrated as a longwall shearer, in other embodiments (not shown), the mining machine 100 may include a feeder-breaker, a continuous miner, a conveyor assembly, a rope shovel, a hybrid mining shovel, a dragline excavator, or another mining machine.

Figure 2:
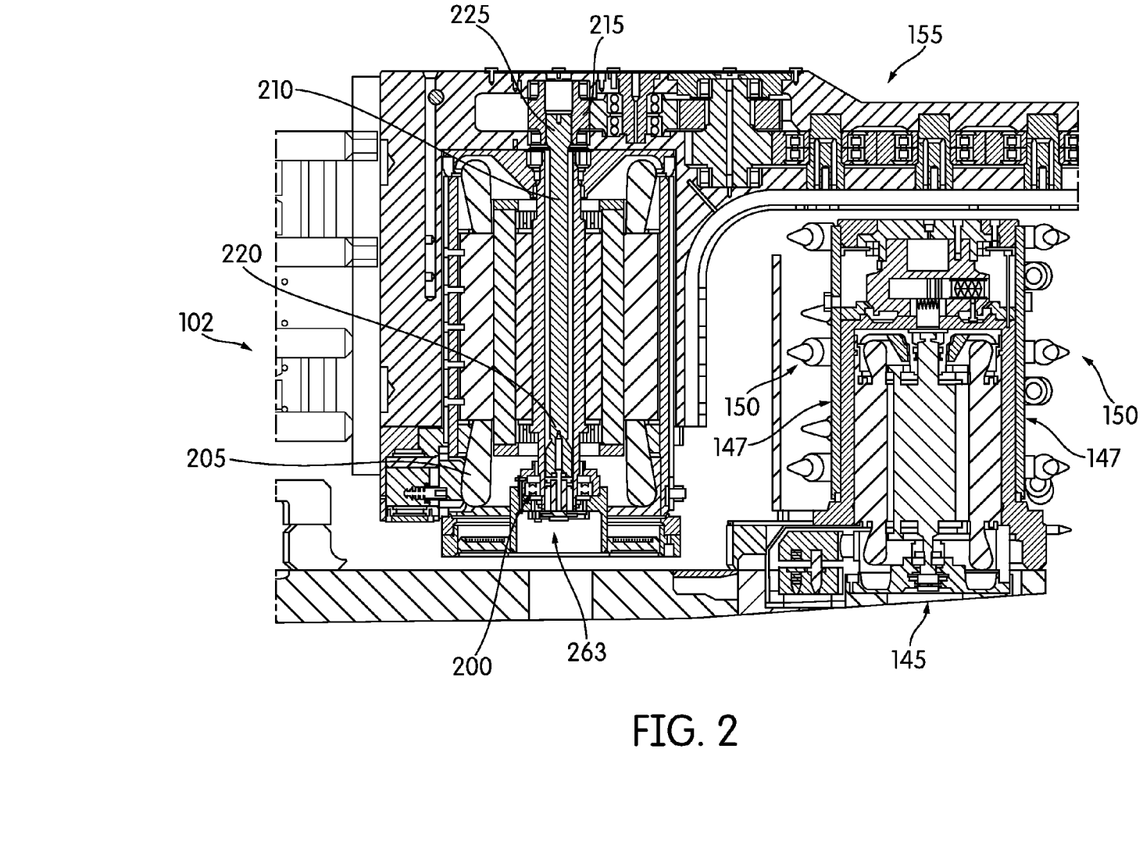
FIG. 2 is a cross-sectional view of a portion of the mining machine of FIG. 1.

The mining machine 100 includes a frame 102 supporting a cutter system 105, which includes a rotating drum 110 with teeth 115 that, essentially, cut material (e.g., coal) from a surface to be mined. The cutter system 105 is rotationally driven by one or more motors (see FIG. 2) via a gear box 155 (FIG. 2). That is, the gear box 155 receives the rotational output of the motor(s) and, in turn, drives the drum 110.

As shown in FIG. 2, the illustrated mining machine 100 further includes a lump breaker 145 operable to break, crush, split, etc., large pieces of removed material to acceptable size. The lump breaker 145 includes a drum 147 supporting a plurality of lump breaker teeth 150 and rotatably driven by a lump breaker motor.

Figure 4:
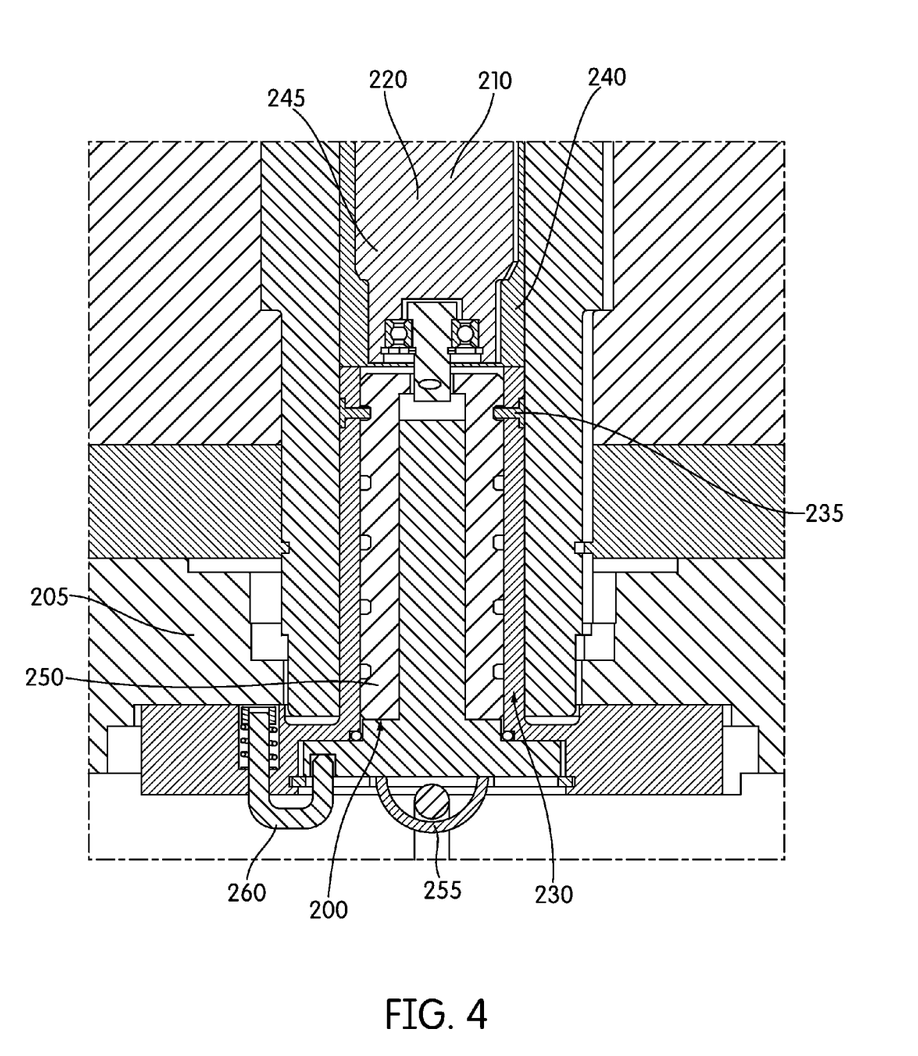
FIG. 4 is a cross-sectional view of a connector assembly for the mining machine of FIG. 1.

The mining machine 100 further includes (see FIG. 4) a connector assembly 200 for a drive arrangement (e.g., between a motor 205 and a drive shaft 210) of the mining machine 100. In the illustrated embodiment, the motor 205 is a motor driving the cutter system 105, and, in other embodiments, the motor 205 may be a motor driving another component (e.g., a lump breaker motor). In some embodiments, the motor 205 is an electric motor, such as an alternating-current motor or a direct-current motor. In other embodiments, a different type of motor may be used. While the drive arrangement (motor 205/drive shaft 210) for the cutter system 105 is shown for illustrative purposes, embodiments illustrated and described herein may be applied to other drive arrangements for the mining machine 100.

Figure 3:
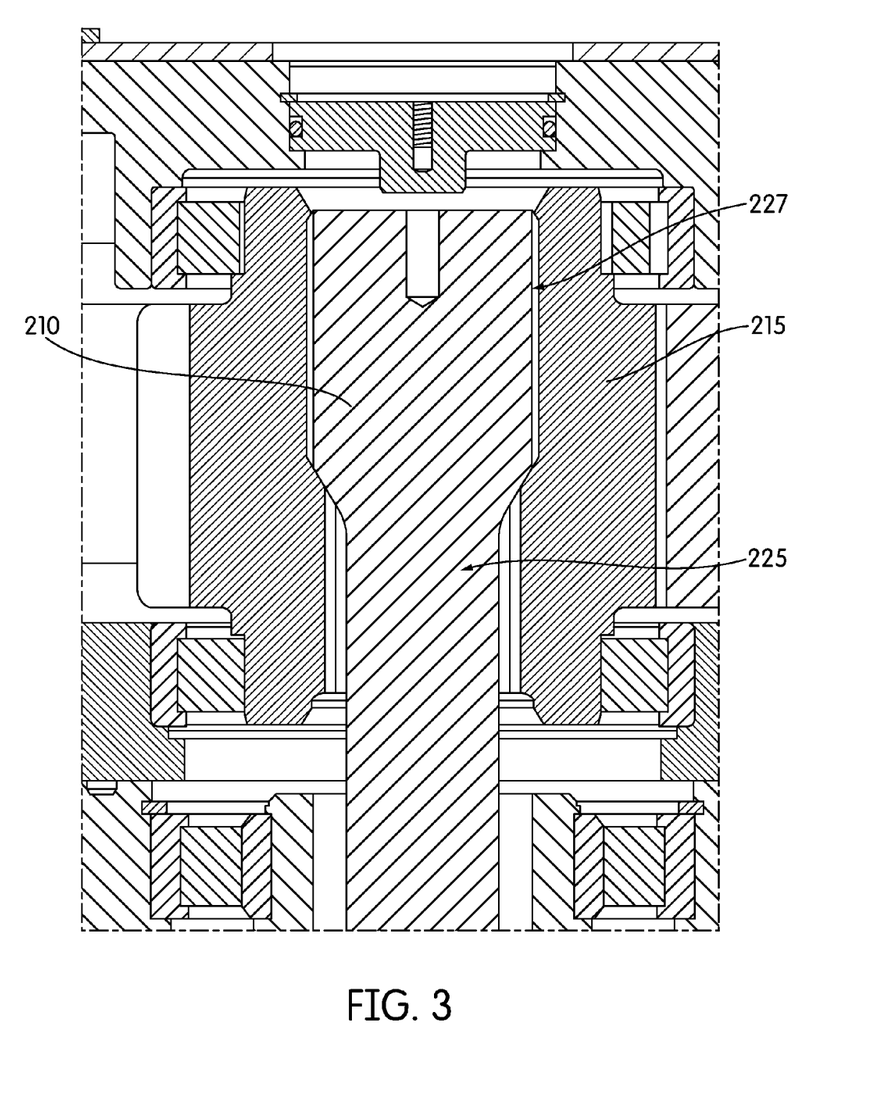
FIG. 3 is a cross-sectional view a drive shaft coupled to a driven member of the mining machine of FIG. 1.

The connector assembly 200 selectively and releasably connects the motor 205 and the drive shaft 210. When engaged, the drive shaft 210 transfers rotational movement from the motor 205 to a driven member 215 (e.g., to the gear box 155 which, in turn, drives the cutter drum 110). The drive shaft 210 selectively engages the motor 205 at a first end 220 and is coupled to the driven member 215 at a second end 225 (see FIG. 3). The drive shaft 210 is axially movable between the positions shown in FIGS. 5a and 5c. A second connection assembly 227 (e.g., a splined connection) is provided at the second end 225 and accommodates axial movement of the drive shaft 210 while maintaining connection between the drive shaft 210 and the driven member 215.

In the illustrated construction, the motor 205 includes (see FIG. 4) a sleeve 230, and the sleeve 230 includes a threaded portion 235 and a motor spline 240. The motor spline 240 is coupled to a rotor of the motor 205 and is rotated upon activation of the motor 205. The drive shaft 210 includes a drive shaft spline 245 located at the first end 220. In the illustrated construction, the splines 240, 245 provide a selective connection between the motor 205 and the drive shaft 210. Engagement of the motor spline 240 and the drive shaft spline 245 drivingly connects the motor 205 and the drive shaft 210, and disengagement of the splines 240, 245 disconnects the motor 205 and the drive shaft 210. When the splines 240, 245 are disengaged, the drive shaft 210 and the driven member 215 are freely rotatable relative to the motor 205, and any rotation of the motor 205 is not transmitted to the drive shaft 210 or to the driven member 215.

In other constructions (not shown), a different connection mechanism between the motor 205 and the drive shaft 210 may be provided. For example, the connection mechanism may have a different structure or shape (e.g., a non-circular shape relative to the axis of the drive shaft 210) to provide a selective driving connection between the motor 205 and the drive shaft 210.

Figure 7:
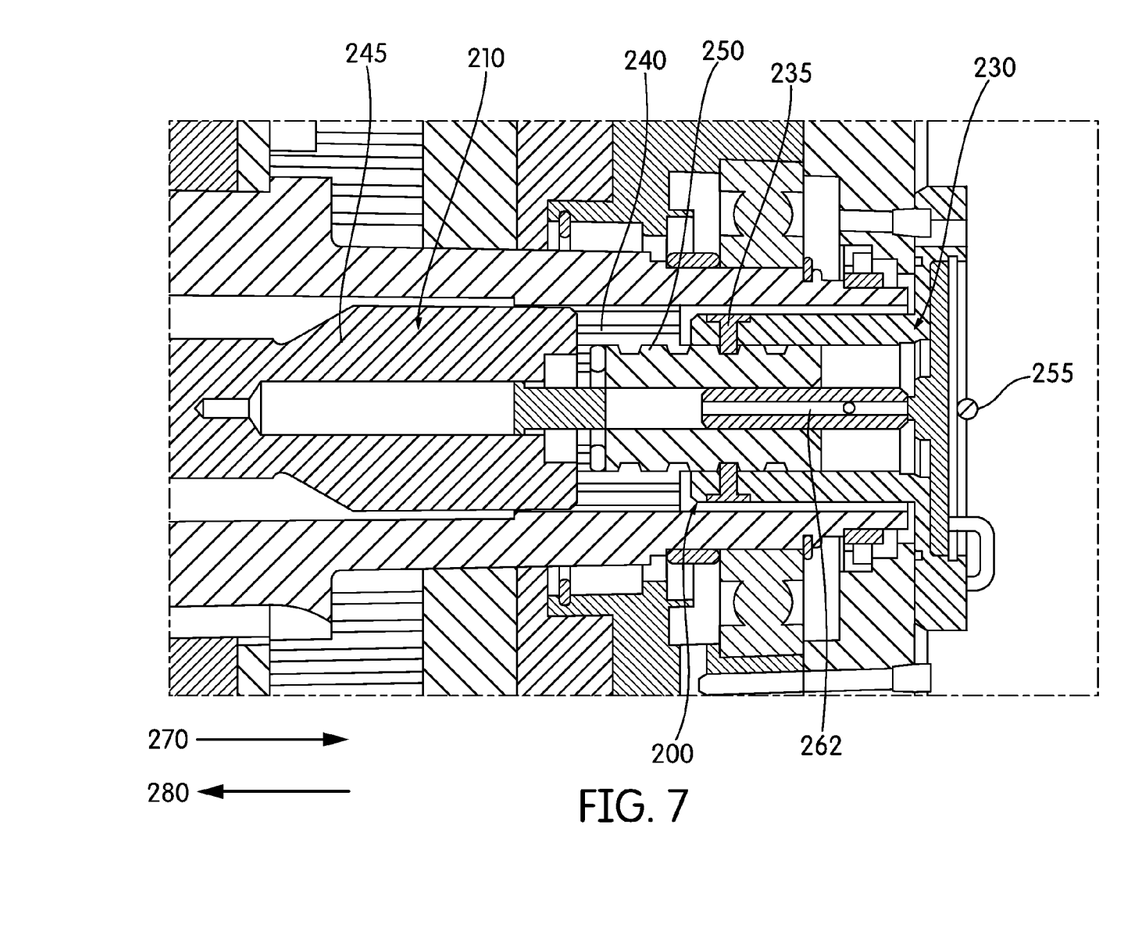
FIG. 7 is a cross-sectional view of the connector assembly of FIG. 4.

The connector assembly 200 also includes an adjustment assembly operable to adjust the connection mechanism (e.g., the splines 240, 245) between a connected condition (see FIGS. 4 and 5c), in which the motor 205 is drivingly connected to the drive shaft 210, and a disconnected condition (see FIG. 5a), in which the driving connection between the motor 205 and the drive shaft 210 is disengaged. In the illustrated construction, the adjustment assembly includes a threaded rotatable member 250, a user-interface or actuator assembly 255, and a locking assembly 260. The member 250 is rotatably coupled to the drive shaft 210 and is further coupled to the user-interface assembly 255 via a telescoping rod 262 (FIG. 7).

The user-interface assembly 255 is accessible to an operator and is pivoted by the operator to adjust the connection mechanism between the connected and disconnected conditions. The user-interface assembly 255 is pivotable but axially fixed relative to the motor 205 and the frame 102. As shown in FIG. 2, the user-interface assembly 255 is provided in a recess 263. A cover (not shown) may be provided to selectively close the recess 263 and cover the adjustment mechanism. In other constructions (not shown), the user-interface assembly 255 may not be in a recess but may be substantially flush with the end of the motor 205.

Figure 5A:
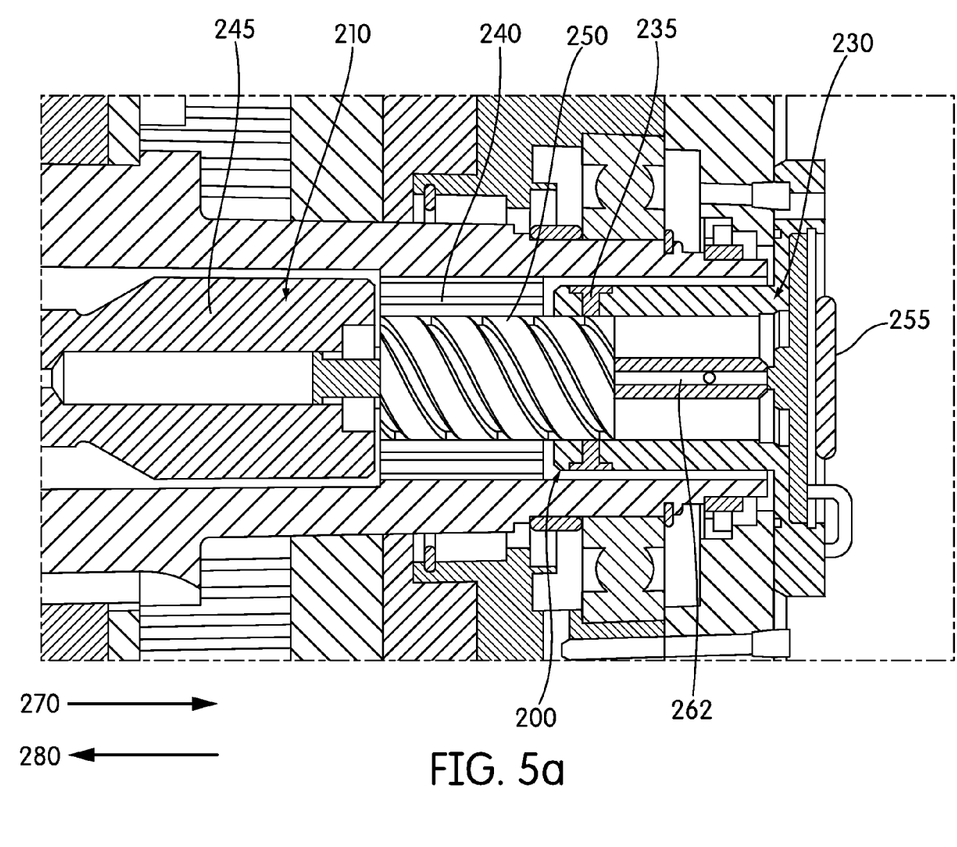
FIGS. 5a-5c are cross-sectional views of the connector assembly illustrating disengagement and engagement of a drive shaft to a motor of the mining machine of FIG. 1.
Figure 5B:
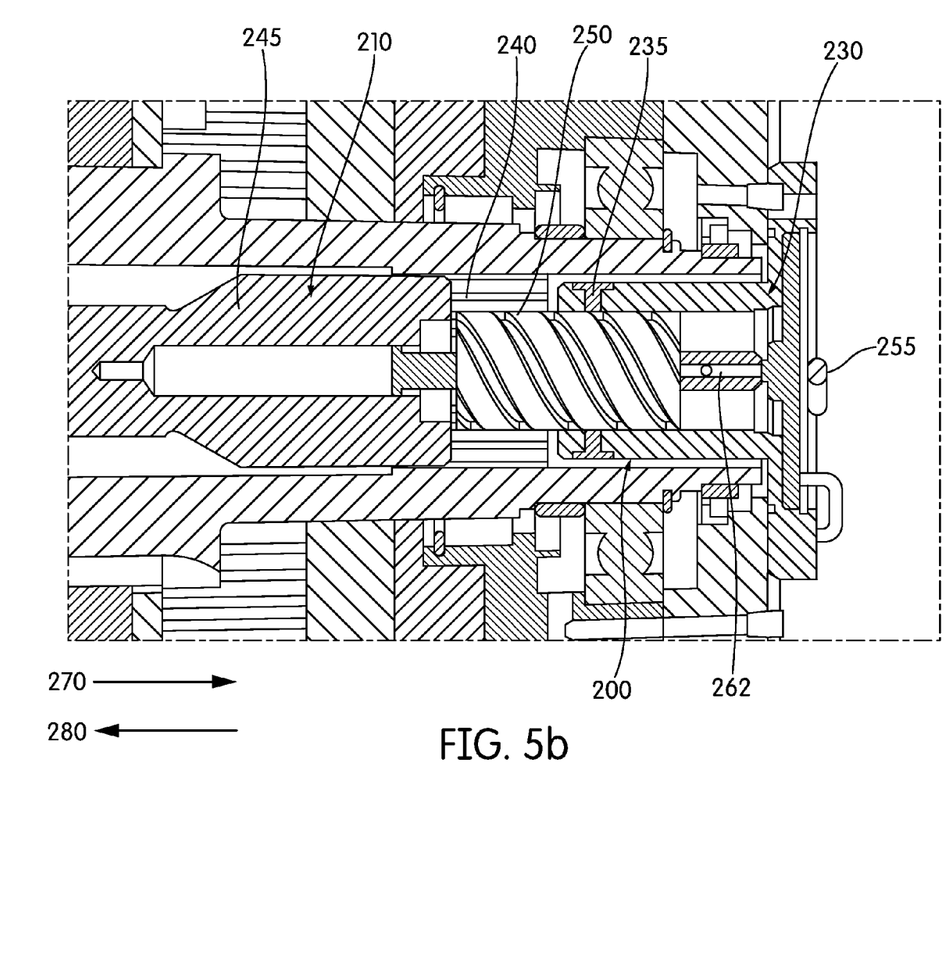
Figure 5C:
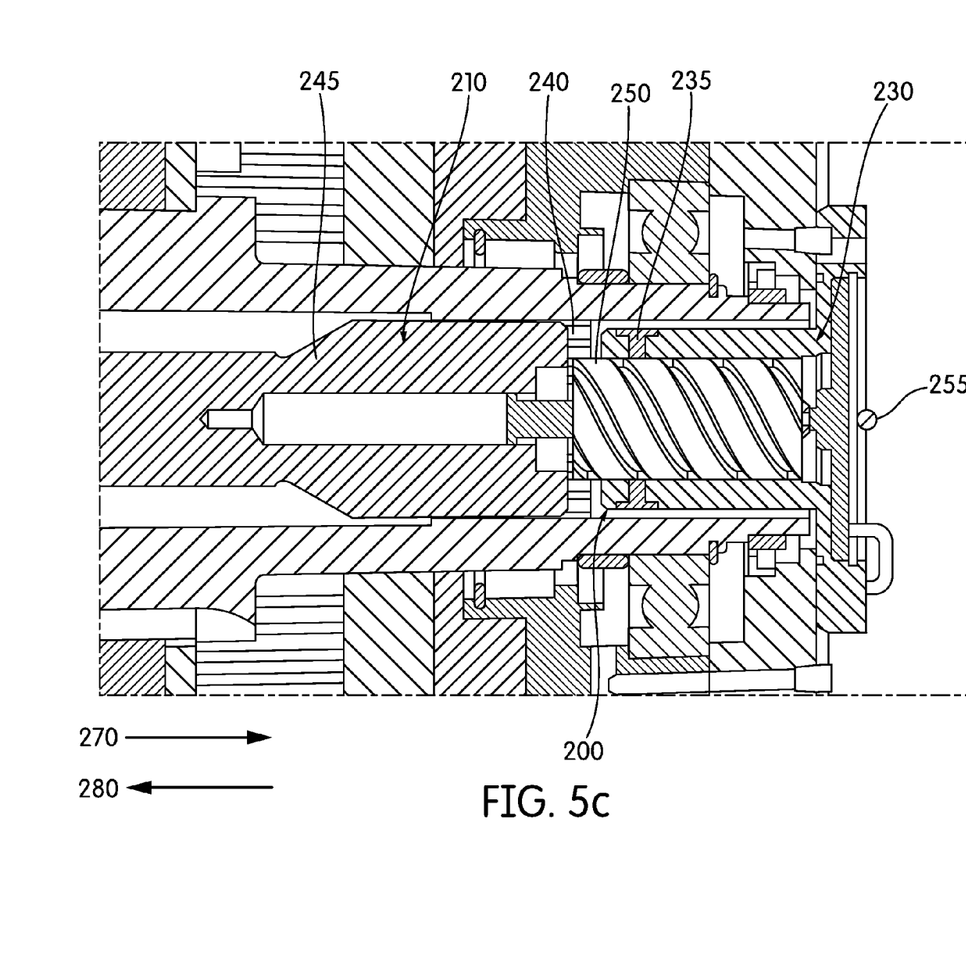

FIGS. 5a-5c illustrate operation of the connection assembly and engagement and disengagement of the motor 205 and the drive shaft 210. FIG. 5a illustrates the connector assembly 200 in a disengaged position corresponding to the disconnected condition of the connection mechanism (with splines 240, 245 disengaged). FIG. 5b illustrates the connector assembly 200 in a position between the disengaged position and an engaged position. FIG. 5c illustrates the connector assembly 200 in the engaged position corresponding to the connected condition of the connection mechanism (with splines 240, 245 drivingly engaged).

Figure 6A:
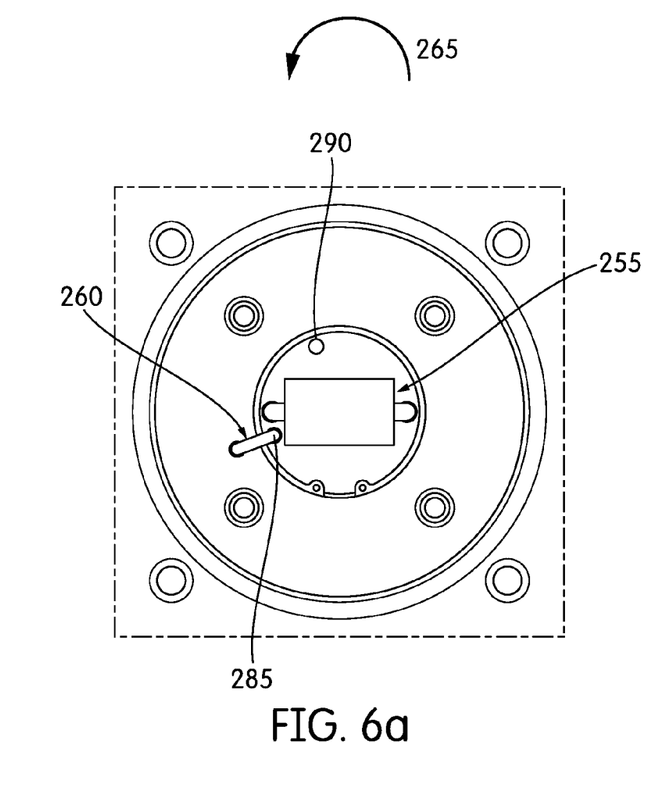
FIGS. 6a-6b are end views of the adjustment mechanism of FIG. 4.

To engage the drive shaft 210 to the motor 205, the operator pivots the user-interface assembly 255 in a first rotational direction 265 (see FIG. 6a). Pivoting movement of the user-interface assembly 255 causes rotation of the threaded rotatable member 250, via the telescoping rod 262. The member 250 is engaged with the threaded portion 235 of the sleeve 230, and rotation of the member 250 results in axial movement in an engagement direction 270 (see FIGS. 5a-5c). Axial movement of the member 250 in the engagement direction 270 moves the drive shaft 210 in the engagement direction 270. As the drive shaft 210 moves in the engagement direction 270, the drive shaft spline 245 engages with the motor spline 240, thus drivingly engaging the drive shaft 210 and the motor 205.

Figure 6B:
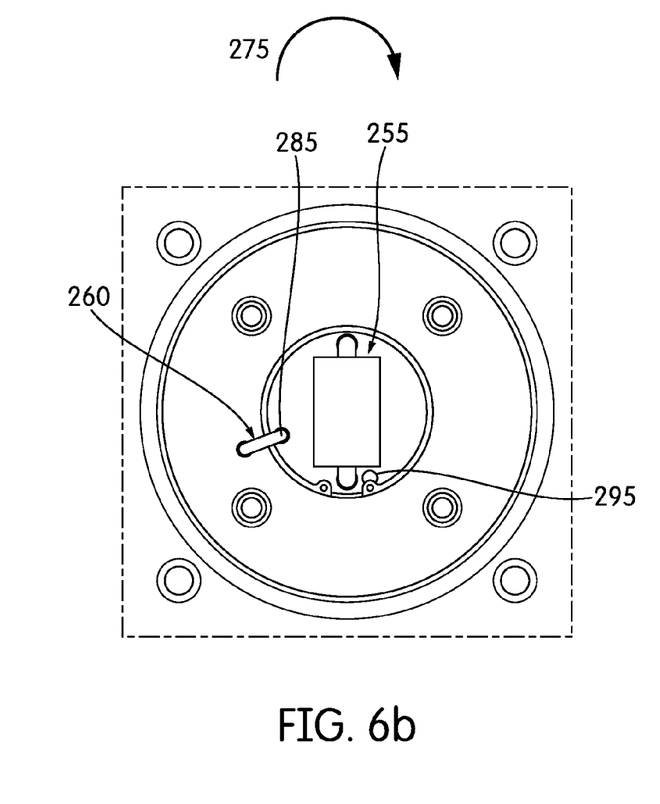

To disengage the drive shaft 210 and the motor 205, the operator pivots the user-interface assembly 255 in an opposite, second rotational direction 275 (see FIG. 6b). Pivoting movement of the user-interface 255 in the second rotational direction 275 causes rotation of the threaded rotatable member 250, via the telescoping rod 262. Due to engagement with the threaded portion 235, rotation of the threaded rotatable member 250 results in axial movement of the threaded rotatable member 250 in a disengagement direction 280 (see FIGS. 5a-5c). Axial movement of the member 250 in the disengagement direction 280 moves the drive shaft 210 in the disengagement direction 280. As the drive shaft 210 is moved in the disengagement direction 280, the drive shaft spline 245 disengages with the motor spline 240, thus disengaging the drive shaft 210 and the motor 205.

The user-interface assembly 255 and the locking assembly 260 are shown in FIGS. 6a-6b. The locking assembly 260 selectively retains the connector assembly 200 in the connected condition or in the disconnected condition. The locking assembly 260 includes a lockout pin 285 having a projection, an engagement keyhole or recess 295, and a disengagement keyhole or recess 290. The projection of the lockout pin 285 is selectively received in the engagement keyhole 295 or in the disengagement keyhole 290 to prevent pivoting movement of the user-interface assembly 255 and, thereby, to prevent adjustment of the connector assembly between the connected and disconnected conditions. The locking assembly 260 further includes a spring member (not shown) operable to bias the projection of the lockout pin 285 into engagement with the engagement keyhole 295 or the disengagement keyhole 290.

When the connector assembly 200 is in the connected condition as shown in FIG. 6a, the projection of the lockout pin 285 is received the engagement keyhole 295 (visible in FIG. 6b), preventing rotation of the user-interface assembly 255 in the second rotational direction 275. When the connector assembly 210 is in the disconnected condition as shown in FIG. 6b, the projection of the lockout pin 285 is received in the disengagement keyhole 290 (visible in FIG. 6a), preventing rotation of the user-interface 255 in the first rotational direction 265. Engagement of the projection in the engagement keyhole 295 or in the disengagement keyhole 290 may also inform the operator that the drive shaft 210 and the motor 205 are engaged or disengaged, respectively.

In the illustrated construction, the user-interface assembly 255 is pivoted over less than 360° (e.g., about 270°) between the connected and disconnected positions. A stop arrangement (not shown) is provided to limit pivoting movement of the user-interface assembly 255 beyond the connected and disconnected positions.

FIG. 7 illustrates a cutaway view of the connector assembly 200. As discussed above, the threaded rotatable member 250 is coupled to the user-interface assembly 255 via the telescoping rod 262. The telescoping rod 262 transfers rotational motion from the user-interface assembly 255 to the member 250 while allowing axial movement of the member 250 in the engagement direction 270 and in the disengagement direction 280. The telescoping rod 262 also guides the member 250 during axial movement.

The mining machine 100 may be manufactured to include the connector assembly (including a connection mechanism and an adjustment mechanism). In other embodiments, the mining machine 100 may be an existing mining machine retrofitted to include the connector assembly.

Thus, the invention may generally provide, among other things, a mining machine including a connector assembly for selectively connecting a drive arrangement, such as a motor and a drive shaft. One or more independent features and/or independent advantages of the invention may be set forth in the claims.

What is claimed is:

1. A mining machine comprising:
    a frame;
    a motor;
    a drive shaft having a first end, a distal end, and an axis;
    a driven component coupled to the drive shaft at the distal end; and
    a connector assembly between the motor and the drive shaft, the connector assembly including
        a connection mechanism operable to drivingly connect the motor and the drive shaft, and
        an adjustment mechanism operable to adjust the connection mechanism between a connected condition, in which the connection mechanism drivingly connects the motor and the drive shaft, and a disconnected condition, in which the driving connection between the motor and the drive shaft is disengaged, the adjustment mechanism including an actuator pivotable, about the axis, between a connected position corresponding to the connected condition of the adjustment mechanism and a disconnected position corresponding to the disconnected condition of the adjustment mechanism, the actuator being axially fixed relative to the frame, the adjustment mechanism further including a first threaded member connected to the actuator for pivoting movement with the actuator, the first threaded member being axially movable relative to the actuator, and a second threaded member rotatable fixed to the frame and cooperating with the first threaded member.

2. The mining machine of claim 1, wherein the connection mechanism includes a spline engagement between the motor and the drive shaft.

3. The mining machine of claim 2, wherein the motor includes a sleeve having an inner surface providing a first spline, and wherein the drive shaft has a second spline proximate the first end, the first spline and the second spline being engageable to provide a driving connection between the motor and the drive shaft.

4. The mining machine of claim 1, wherein the drive shaft is movable along the axis, the adjustment mechanism being operable to move the drive shaft along the axis between the connected condition and the disconnected condition.

5. The mining machine of claim 4, wherein the adjustment mechanism includes a telescoping member connected between the actuator and the drive shaft, pivoting movement of the actuator causing selective extension and retraction of the telescoping member and axial movement of the drive shaft.

6. The mining machine of claim 1, wherein the first threaded member and the second threaded member are connected for coordinated axial movement, and wherein pivoting movement of the actuator causes pivoting movement of the first threaded member relative to the second threaded member, pivoting movement of the first threaded member relative to the second threaded member causes axial movement of the first threaded member relative to the actuator, and axial movement of the first threaded member causes axial movement of the drive shaft.

7. The mining machine of claim 1, wherein the adjustment mechanism includes a locking assembly, the locking assembly being operable to selectively retain the adjustment mechanism in at least one of the connected condition and the disconnected condition.

8. The mining machine of claim 7, wherein the locking assembly is operable to selectively retain the adjustment mechanism in each of the connected condition and the disconnected condition.

9. The mining machine of claim 8, wherein the locking assembly includes
    a projection connected to the actuator, and
    a first recess and a second recess defined by the frame, the projection being selectively engaged in the first recess to retain the actuator in the connected position and in the second recess to retain the actuator in the disconnected position.

10. The mining machine of claim 9, wherein the locking assembly further includes a spring member operable to bias the projection into engagement with the first recess and with the second recess.

11. The mining machine of claim 1, further comprising a second connection assembly between the drive shaft and the driven component, the second connection assembly maintaining a driving connection between the drive shaft and the driven component in the connected condition and the disconnected condition.

12. The mining machine of claim 1, wherein the actuator is pivotable in a first direction to cause adjustment of the connection mechanism from the connected condition toward the disconnected condition, the actuator being pivotable in a second direction to cause adjustment of the connection mechanism from the disconnected condition toward the connected condition.

13. The mining machine of claim 1, wherein the mining machine includes one of a longwall shearer and a feeder-breaker.

14. The mining machine of claim 13, wherein the driven component includes gear box drivingly connected to a corresponding one of a shearer and a lump breaker.

15. A connector assembly for a mining machine, the mining machine including a frame, a motor, a drive shaft having a first end, a distal end, and an axis, and a driven component coupled to the drive shaft at the distal end, the connector assembly being between the motor and the drive shaft, the connector assembly comprising:
a connection mechanism operable to drivingly connect the motor and the drive shaft; and
an adjustment mechanism operable to adjust the connection mechanism between a connected condition, in which the connection mechanism drivingly connects the motor and the drive shaft, and a disconnected condition, in which the driving connection between the motor and the drive shaft is disengaged, the adjustment mechanism including an actuator pivotable, about the axis, between a connected position corresponding to the connected condition of the adjustment mechanism and a disconnected position corresponding to the disconnected condition of the adjustment mechanism, the actuator being axially fixed relative to the frame, the adjustment mechanism further including a first threaded member connected to the actuator for pivoting movement with the actuator, the first threaded member being axially moveable relative to the actuator, and a second threaded member rotatably fixed to the frame and cooperating with the first threaded member.

16. A method of operating a mining machine, the mining machine including a frame, a motor, a drive shaft having a first end, a distal end, and an axis, a driven component coupled to the drive shaft at the distal end, and a connector assembly between the motor and the drive shaft, the method comprising:
providing a connection mechanism operable to drivingly connect the motor and the drive shaft;
providing an adjustment mechanism operable to adjust the connection mechanism, the adjustment mechanism including an actuator pivotable about the axis, the actuator being axially fixed relative to the frame, the adjustment mechanism further including a first threaded member connected to the actuator for pivoting movement with the actuator, the first threaded member being axially moveable relative to the actuator, and a second threaded member rotatably fixed to the frame and cooperating with the first threaded member;
adjusting the connection mechanism to one of a connected condition, in which the connection mechanism drivingly connects the motor and the drive shaft, and a disconnected condition, in which the driving connection between the motor and the drive shaft is disengaged; and
pivoting the actuator about the axis from a position corresponding to the one of the connected condition and the disconnected condition to a position corresponding to the other of the connected condition and the disconnected condition.

* * * * *